US008005992B1

(12) United States Patent
Pichumani et al.

(10) Patent No.: US 8,005,992 B1
(45) Date of Patent: Aug. 23, 2011

(54) SCALABLE STORAGE AND RETRIEVAL OF MULTIPLE ASYNCHRONOUS SIGNALS

(75) Inventors: Ramani Pichumani, Palo Alto, CA (US); Catherine Bunting, Phoenix, AZ (US)

(73) Assignee: Cadence Design Systems, Inc., San Jose, CA (US)

( * ) Notice: Subject to any disclaimer, the term of this patent is extended or adjusted under 35 U.S.C. 154(b) by 1247 days.

(21) Appl. No.: 11/580,535

(22) Filed: Oct. 13, 2006

(51) Int. Cl.
*G06F 17/30* (2006.01)
(52) U.S. Cl. ............... 710/1; 326/93; 716/132
(58) Field of Classification Search .......... 710/52
See application file for complete search history.

(56) References Cited

U.S. PATENT DOCUMENTS

| 6,301,578 | B1 | 10/2001 | Harris |
| 6,877,146 | B1 * | 4/2005 | Teig et al. ............ 716/129 |
| 6,988,257 | B2 * | 1/2006 | Teig et al. ............ 716/129 |
| 7,024,652 | B1 * | 4/2006 | McGaughy et al. ...... 716/115 |
| 7,143,021 | B1 * | 11/2006 | McGaughy et al. ...... 703/14 |
| 7,257,525 | B2 * | 8/2007 | McGaughy ............. 703/14 |
| 7,269,541 | B1 * | 9/2007 | McGaughy et al. ...... 703/14 |
| 7,283,231 | B2 * | 10/2007 | Brady et al. ........... 356/326 |
| 7,328,143 | B2 * | 2/2008 | McGaughy ............. 703/14 |
| 7,392,170 | B1 * | 6/2008 | McGaughy et al. ...... 703/14 |
| 7,409,328 | B1 * | 8/2008 | McGaughy et al. ...... 703/14 |
| 7,415,403 | B2 * | 8/2008 | McGaughy ............. 703/14 |
| 2005/0278405 | A1 * | 12/2005 | Jaber .................. 708/404 |

OTHER PUBLICATIONS

T.H. Cormen, C.E. Leiserson and R.L. Rivest, Introduction to Algorithms, First Edition, MIT Press and McGraw-Hill, 1990, Table of Contents, pp. v-xi and Chapter 19: B-Trees, pp. 381-399.
U.S. Appl. No. 11/228,281, filed Sep. 16, 2005 to inventors Pichumani, et al. titled "Method and System for Displaying Large Data Signals."

* cited by examiner

*Primary Examiner* — Cheng-Yuan Tseng
(74) *Attorney, Agent, or Firm* — Schwegman, Lundberg & Woessner, P.A.

(57) ABSTRACT

A method of processing signals includes: sampling multiple signals, where each sampled signal includes multiple signal values and corresponding time values; partitioning the sampled signals into multiple partitions, where each partition includes signal values and corresponding time values for signals having identical time values within a partition time interval and where at least one additional partition is formed when two sampled signals diverge from identical time values; and saving signal values and time values from partitions in buffers corresponding to the partitions, where the buffers represent allocations of memory for saving partition values.

27 Claims, 21 Drawing Sheets

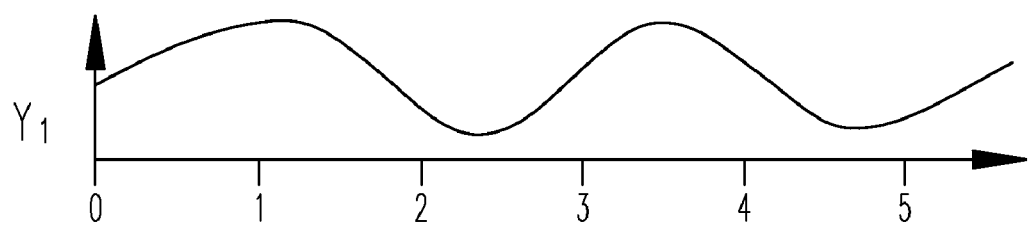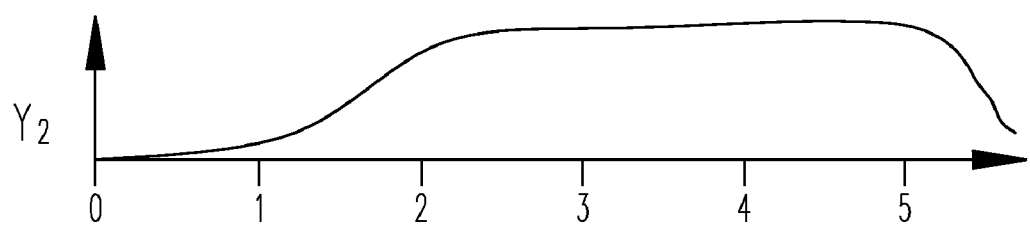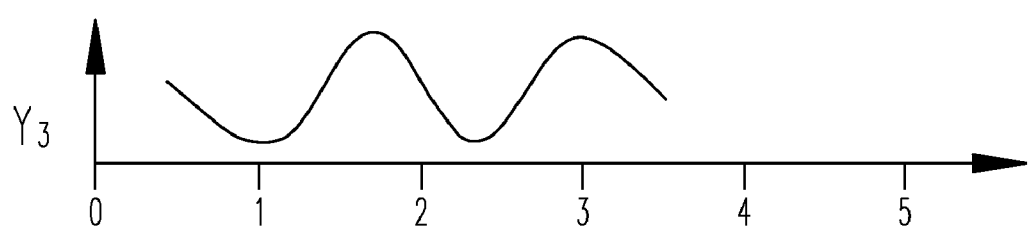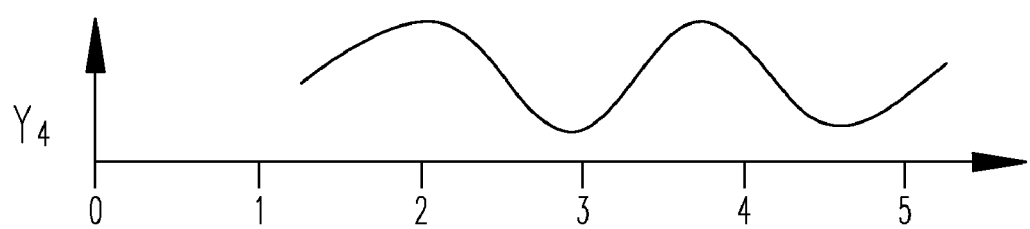
Fig.2

| SAMPLE # | TIME | $Y_1$ | $Y_2$ | $Y_3$ | $Y_4$ |
|---|---|---|---|---|---|
| 1 | 0.0 | $Y_{11}$ | | | |
| 2 | 0.5 | | $Y_{21}$ | | |
| 3 | 1.0 | $Y_{13}$ | | $Y_{32}$ | |
| 4 | 1.5 | | $Y_{23}$ | $Y_{33}$ | |
| 5 | 2.0 | $Y_{15}$ | | | $Y_{44}$ |
| 6 | 2.5 | | $Y_{25}$ | $Y_{35}$ | |
| 7 | 2.75 | | | $Y_{36}$ | |
| 8 | 3.0 | $Y_{18}$ | $Y_{28}$ | | $Y_{47}$ |
| 9 | 3.5 | | | $Y_{38}$ | |
| 10 | 4.0 | $Y_{110}$ | $Y_{210}$ | $Y_{39}$ | $Y_{410}$ |
| 11 | 5.0 | $Y_{111}$ | $Y_{211}$ | | $Y_{411}$ |
| 12 | 5.25 | | | | $Y_{512}$ |

Fig.3

| BLOCK 1: | X1 | $Y_{11}$ | $Y_{21}$ | $Y_{31}$ | $Y_{41}$ |
|---|---|---|---|---|---|
| | X2 | $Y_{12}$ | $Y_{22}$ | $Y_{32}$ | $Y_{42}$ |
| | X3 | $Y_{13}$ | $Y_{23}$ | $Y_{33}$ | $Y_{43}$ |
| | X4 | $Y_{14}$ | $Y_{24}$ | $Y_{34}$ | $Y_{44}$ |

| BLOCK 2: | X5 | $Y_{15}$ | $Y_{25}$ | $Y_{35}$ | $Y_{45}$ |
|---|---|---|---|---|---|
| | X6 | $Y_{16}$ | $Y_{26}$ | $Y_{36}$ | $Y_{46}$ |
| | X7 | $Y_{17}$ | $Y_{27}$ | $Y_{37}$ | $Y_{47}$ |
| | X8 | $Y_{18}$ | $Y_{28}$ | $Y_{38}$ | $Y_{48}$ |

| BLOCK 3: | X9 | $Y_{19}$ | $Y_{29}$ | $Y_{39}$ | $Y_{49}$ |
|---|---|---|---|---|---|
| | X10 | $Y_{110}$ | $Y_{210}$ | $Y_{310}$ | $Y_{410}$ |
| | X11 | $Y_{111}$ | $Y_{211}$ | $Y_{311}$ | $Y_{411}$ |
| | X12 | $Y_{112}$ | $Y_{212}$ | $Y_{312}$ | $Y_{412}$ |

ETC....

*Fig. 4*

804 — 1. FOR EACH SIGNAL VALUE, INVOKE PUTVALUE(SIGNAL, VALUE)

- IF THE SIGNAL IS NEW:

ALLOCATESTORAGEFOR(SIGNAL)
    ADJUSTBUFFERLIMITS()

- IF THE VALUE IS ALSO A TIME POINT:

SET CURRENT_TIME TO VALUE.

IF MAXIMUM NUMBER OF SAMPLES IN SIGNAL BUFFER EXCEEDED, THEN

FLUSHNODE(@DEPTH=0);
       UPDATEPARENTNODE(@DEPTH=1);

- ELSE, UPDATEMINMAXVALUES(SIGNAL, VALUE)

806 — 2. TO UPDATEPARENTNODE(@DEPTH):

- CREATE NEW NODE IF NONE EXISTS

- IF (DEPTH>=MAXDEPTH) END-OF-RECURSION

- IF MAXIMUM NUMBER OF SAMPLES IN PARENT NODE EXCEEDED, THEN

UPDATEPARENTNODE(DEPTH+1)
    UPDATEMINMAXVALUES(SIGNAL, VALUE)
    FLUSHNODE(@DEPTH)

- APPEND NODE BLOCK SUMMARY DATA TO FILE[DEPTH]

808 — 3. AFTER ALL SIGNALS HAVE BEEN PROCESSED, INVOKE CLOSE DATASET(DEPTH=0):

- IF (DEPTH>=MAXDEPTH) END-OF-RECURSION

- FLUSHNODE(@DEPTH+1)

*Fig. 8*

1. CREATE A SINGLE PARTITION P1 THAT CONTAINS ALL KNOWN SIGNALS.
2. FOR EACH LEAF DATA BLOCK, ITERATE:
   - SET THE SAMPLE COUNT INDEX i TO ZERO
   - ALLOCATE A UNIQUE Y-VECTOR BLOCK FOR EACH SIGNAL
   - ALLOCATE ONE X-VECTOR BLOCK FOR EACH PARTITION (FIGURE 17 BELOW SHOWS AN EXAMPLE WHERE THE BLOCK SIZE IS FOUR SAMPLE POINTS.)
   - FOR A GIVEN SIGNAL $V_n$ SAMPLE POINT WRITTEN $(X_n, Y_n)$:
     ○ IF THIS IS THE FIRST SAMPLE POINT WRITTEN IN THIS BLOCK, THEN SET $X[i] = X_n$.
     ○ OTHERWISE, CHECK TO SEE $X_n$ MATCHES THE CURRENT TIME POINT $X[i]$
     ○ IF $X_n == X[i]$, THEN SIMPLY APPEND THE $Y_n$ VALUE: $Y_n[i] = Y_n$
     ○ OTHERWISE, FORKSIGNAL($V_n$, @DEPTH) [SEE BELOW]
   - REPEAT STEP 2 UNTIL A GIVEN PARTITION Y-VECTOR BLOCK IS HAS BECOME FULL (SEE FIGURE 17 BELOW)
3. IF ANY PARTITION'S Y-VECTOR BLOCKS ARE FULL, THEN WRITE OUT DATA FOR THAT PARTITION AS A CONTIGUOUS LOGICAL BLOCK AND REPEAT STEP 2.

*Fig 13A*

4. TO FORKSIGNAL($V_n$):

- FIND A DIFFERENT PARTITION, $P_n$, WHOSE X-VALUES MATCH THAT OF $V_n$'S
- IF NO SUCH PARTITION EXISTS, THEN CREATE A NEW PARTITION THAT CONTAINS THE SIGNAL $V_n$.
- UPDATE X-VECTOR POINTERS FOR EACH TO REFLECT THE NEWLY FORKED BLOCK (SEE FIGURE 3 BELOW)
- FORK HIERARCHY($V_n$, @DEPTH)

5. TO FORKHIERARCHY($V_n$, @DEPTH)

- IF DEPTH == MAXDEPTH, END OF RECURSION
- OTHERWISE, VISIT ALL ANCESTOR NODES OF CURRENT DATA BLOCK AND FORKNODE(ANCESTOR).

6. TO FORKNODE() OF A GIVEN ANCESTOR NODE:

- REMOVE THE CHILD POINTER CORRESPONDING TO THE FORKED SIGNAL FROM THE OLD PARTITION'S NODE AND ADD IT TO THE ANCESTOR NODE OF THE NEW PARTITION NODE. IF NO SUCH NODE EXIST, THEN CREATE A NEW NODE FOR THIS SIGNAL. (FIGURE 5 BELOW SHOWS THE NEWLY FORKED HIERARCHY)

7. IF ANY PARTITION'S Y-VERCTOR BLOCKS ARE FULL, THEN WRITE OUT DATA FOR THAT PARTITION AS A CONTIGUOUS LOGICAL BLOCK AND REPEAT STEP 2.

8. AFTER ALL SIGNALS HAVE BEEN PROCESSED, INVOKE FLUSHTREENODES(DEPTH=0)

*Fig13B*

TEMPORAL COHERENCY — 1602

| OUTPUT SEQUENCE # | SAMPLE VALUE |
|---|---|
| 1 | $Y_{11}$ |
| 2 | $Y_{21}$ |
| 3 | $Y_{31}$ |
| 4 | $Y_{12}$ |
| 5 | $Y_{22}$ |
| 6 | $Y_{32}$ |
| 7 | $Y_{41}$ |
| 8 | $Y_{13}$ |
| 9 | $Y_{23}$ |
| 10 | $Y_{33}$ |
| 11 | $Y_{34}$ |
| 12 | $Y_{42}$ |
| 13 | $Y_{14}$ |
| 14 | $Y_{24}$ |
| 15 | $Y_{35}$ |

SIGNAL COHERENCY — 1604

| OUTPUT SEQUENCE # | SAMPLE VALUE |
|---|---|
| 1 | $Y_{11}$ |
| 2 | $Y_{12}$ |
| 3 | $Y_{13}$ |
| 4 | $Y_{14}$ |
| 5 | $Y_{15}$ |
| 6 | $Y_{21}$ |
| 7 | $Y_{22}$ |
| 8 | $Y_{23}$ |
| 9 | $Y_{24}$ |
| 10 | $Y_{25}$ |
| 11 | $Y_{31}$ |
| 12 | $Y_{32}$ |
| 13 | $Y_{33}$ |
| 14 | $Y_{34}$ |
| 15 | $Y_{35}$ |

SCALABLE STORAGE AND RETRIEVAL OF MULTIPLE ASYNCHRONOUS SIGNALS

BACKGROUND OF THE INVENTION

1. Field of Invention

The present invention relates to signal processing generally and more particularly to the storage and retrieval of sampled data from multiple asynchronous signals, especially in applications involving large data sets.

2. Description of Related Art

As computer-based simulations of dynamic systems such as integrated circuit designs become larger and more complex, the sheer volume of multi-dimensional output generated by such simulations is rapidly exhausting the ability of analysis tools to manage and post-process such data. One of the biggest challenges in representing very large and wide time-series data is organizing and storing the layout structure in a manner that permits high-performance reading, writing, and visualization of such data. While some conventional schemes allow for rapid output and storage of data, they generally do not facilitate rapid reading of the stored data, especially for those schemes with multiple asynchronous anisotemporal sampling rates (also referred to as multi-rate data sampling). Conversely, other conventional schemes may allow for rapid retrieval of data, but do not facilitate rapid storage of the data. Still others may provide both rapid reading and writing of data, but do not facilitate post-analysis, manipulation, or visualization of stored data. Finally, the ability to scale conventional schemes to increasingly larger numbers of signal sets creates additional performance and scalability bottlenecks. (See, for example, U.S. Pat. No. 6,301,578, "Method of Compressing Integrating Circuit Simulation Data," Oct. 9, 2001.)

Conventional solutions have generally focused on providing internal buffering and reorganization as a means to improve input/output performance. These solutions work reasonably well for limited number of data signals (on the order of thousands, as opposed to millions of signals). However, when the number of signals to be buffered becomes too large, the memory overhead reduces the total memory available to the running program and thereby adversely affects performance and scalability. For large-scale simulation applications, memory demands are severe enough that imposing additional overhead renders such techniques impractical.

Another major drawback with many conventional solutions is that they attempt to locate requested data segments as precisely as possible using their logical disk locations. Such precise locating of data may involves a number of overhead requirements including: constructing relatively large indexes for locating the data, requiring a large number of disk seeks and reads to compute the precise starting location for data reads, computing precise stride lengths to retrieve subsequent data. As a result, these approaches lack the ability to provide size- and scale-independent access performance when retrieving and visualizing very large and wide time-series data sets. As the complexity and speed of circuit simulation applications have progressively increased, the ability of existing data representations to scale up in performance to match the larger data volumes has lagged significantly. For example, a simulation dataset consisting of thousands of analog signals with several hundred million time samples may take minutes or even hours to retrieve, display, and manipulate with a conventional visualization program. Furthermore, prior solutions have generally not addressed the performance challenges created by anisotemporal signal streams. Such streams are increasingly used for minimizing data storage space and reducing post-processing overhead.

Thus, there is a need for improved methods and systems for storage and retrieval of multiple asynchronous signals.

SUMMARY OF THE INVENTION

In one embodiment of the present invention, a method of processing signals includes: sampling multiple signals, where each sampled signal includes multiple signal values and corresponding time values; partitioning the sampled signals into multiple partitions, where each partition includes signal values and corresponding time values for signals having identical time values within a partition time interval and where at least one additional partition is formed when two sampled signals diverge from identical time values; and saving signal values and time values from partitions in buffers corresponding to the partitions, where the buffers represent allocations of memory for saving partition values.

According to one aspect of this embodiment, the method may further include: storing at least some buffer values in blocks when sizes of the buffers reach corresponding buffer-limit sizes; and flushing the stored buffer values from the buffers to free-up corresponding allocations of memory. Additionally, with respect to this aspect, the method may further include adjusting one or more buffer-limit sizes to control a combined allocation of memory for the buffers.

According another aspect, the method may further include allocating memory for one or more additional buffers in response to sampling one or more additional signals. According another aspect, the method may further include splitting at least one buffer into multiple buffers when corresponding signals diverge from identical time values so that the multiple buffers correspond to partitions having identical time values.

According another aspect, the method may further include determining buffer-characterizing values for characterizing the signal values in the buffers. Additionally, with respect to this aspect, the buffer-characterizing values may include minimum signal values and maximum signal values for sampled signals in a corresponding partition.

According another aspect, the method may further include: arranging the buffers sequentially into a first level of nodes; and determining an arrangement of second level of nodes so that each second level-node corresponds to a sequence of the first level nodes. Additionally, with respect to this aspect, the method may further include determining an arrangement of third level of nodes so that each third level-node corresponds to a sequence of the second level nodes. Additionally, with respect to this aspect, the method may further include determining node-characterizing values for second-level nodes from the buffer-characterizing values of buffers corresponding to the second-level nodes.

According another aspect, the method may further include: arranging the buffers into multiple levels including a first level and multiple higher-order levels, where the first level includes a sequential arrangement of nodes corresponding to the buffers, and higher-order levels correspond to sequential arrangements of nodes on previous-order levels. Additionally, with respect to this aspect, the method may further include determining node-characterizing values for nodes at higher-order levels based on node-characterizing values at previous-order levels, where the node-characterizing values for the first level are the buffer-characterizing values.

Additional embodiments relate to an apparatus for carrying out any one of the above-described methods, where the apparatus may include a computer for executing instructions related to the method. For example, the computer may include a processor with memory for executing at least some of the instructions. Additionally or alternatively the computer may include a specialized microprocessor or other hardware for executing at least some of the instructions. Additional embodiments also relate to a computer-readable medium that stores (e.g., tangibly embodies) a computer program for carrying out any one of the above-described methods with a computer.

In these ways the present invention enables improved methods and systems for storage and retrieval of multiple asynchronous signals.

BRIEF DESCRIPTION OF THE DRAWINGS

FIG. 2 shows an exemplary set of time-series data for multiple signals.

FIG. 3 shows an exemplary sparse-matrix table representation of the multi-rate signal set shown in FIG. 2.

FIG. 4 shows a conventional block structure for sampled values of four synchronous signals.

FIG. 8 shows pseudo-code for constructing a hierarchical tree structure in the case of a single-rate (i.e., synchronous) partition for the embodiment shown in FIG. 7.

FIGS. 13A and 13B show pseudo-code for partitioning multi-rate (i.e., asynchronous) signals into single-rate partitions for the embodiment shown in FIG. 7.

FIG. 16 shows exemplary features for temporal coherency and signal coherency in a characteristic data set.

DETAILED DESCRIPTION OF EXEMPLARY EMBODIMENTS

Figure 1:
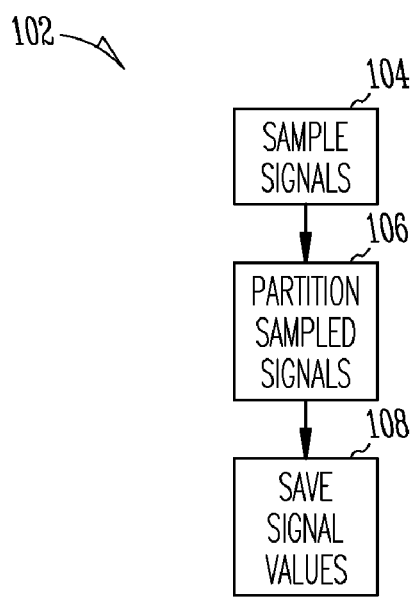
FIG. 1 shows a method of processing signals according to an embodiment of the present invention.

An embodiment of the present invention is shown in FIG. 1. A method 102 of processing signals includes sampling multiple signals 104, where each sampled signal typically includes a set of signal values and corresponding time values. Note that in this context, we use sampling to denote the generation or acquisition of values for a signal where the corresponding time values may be explicit or implicit (e.g. a uniform time step). Variations of sampling (e.g., statistical sampling or sub-sampling) are possible.

Next the sampled signals are partitioned 106 in order to group signals together with identical time values across a time interval. Next the signal values and corresponding time values are saved 108 in buffers corresponding to the partitions, where these buffers represent allocations in memory (e.g., RAM (Random Access Memory)) and facilitate retention of corresponding buffer values as blocks of data in permanent or nonvolatile storage (e.g., in a hard disk system). As discussed below in detail, the signals are partitioned 106 dynamically so that signals that are initially synchronous and partitioned together can be partitioned separately when they become asynchronous. Further, as discussed below in detail, the buffer values are saved 108 in a hierarchical arrangement that enables efficient data access.

FIG. 2 shows an example of a set of time series data set that illustrates the properties of the input signals. Four signals (Y1, Y2, Y3, Y4) are shown with various sampling periods. The signals Y1 and Y2 have an identical uniform sampling period of one second between the time interval [0, 5]. Signal Y3 starts being sampled at time=0.5 with a uniform period of 0.5 and stops being sampled at time=3.5. Signal Y4 starts being sampled at time=1.25 and has non-uniformly spaced sampling intervals and stops at time=5.25.

At the beginning of the sequence shown in FIG. 2, only Y1 and Y2 are known to contribute any sample values. At time=0.5, signal Y3 starts contributing values at its own sampling rate of 0.5. At time=1.25, all four signals are contributing sample values and by time=5.25, only signal Y4 is contributing.

FIG. 3 shows a sparse-matrix table representation of the multi-rate signal set shown in FIG. 2. By grouping synchronous signals together as partitions, signals Y1 and Y2 can be assigned to a first partition (i.e., partition set #1) while signal Y3 is assigned to a second set and Y4 is assigned to third set. The signals Y1 and Y2 are defined to be iso-temporal (i.e., have identical X-vector values), the remaining signals Y3, Y4, and Y5 are considered non-iso-temporal, or multi-rate (i.e., having dissimilar X-vector values). This relationship makes it very difficult to perform efficient read/write operations on such signals using standard block I/O system calls in conventional operational settings.

For example, FIG. 4 shows a conventional block structure for sampled values of four synchronous signals (Y1, Y2, Y3, Y4) indexed by identical time values (X). Three blocks (labeled Block 1, Block 2, and Block 3) are shown. The uniform block size, which is sufficient for storing sampled values for the four signals indexed by four time values (e.g., X1, X2, X3, X4 in Block 1), corresponds to an allocation in memory (e.g., a buffer size in RAM) for the sampled values and also to the size of corresponding blocks of data in permanent storage.

Buffering signal values in memory presents substantial challenges for large-order systems (e.g., many signals or long time windows) particularly in applications for asynchronous signals (e.g., FIG. 3), where sparse data structures result from the lack of signal uniformity (e.g., FIG. 4).

Conventional approaches for improving performance is to buffer signals in memory by providing each signal with its own fixed sized write buffer and flushing the contents of each buffer they get filled. Various algorithms can be employed for determining the optimal buffer size for various hardware and OS (operating system) configurations. However, these types of solution typically suffer from the drawback that they impose a very high memory overhead penalty for each signal that is to be written. This overhead becomes very expensive for multi-rate signal sets that exceed millions of signals. For example, a signal buffer with 1000 elements used to store one million multi-rate signals would imposes a 1000× overhead on resident memory usage. Therefore, an application that is simulating one million memory resident signals would require an additional 8 GB of memory simply to buffer all the signals, regardless of the number of time samples written. As a result, these solutions are not useful in many practical applications.

Figure 5:
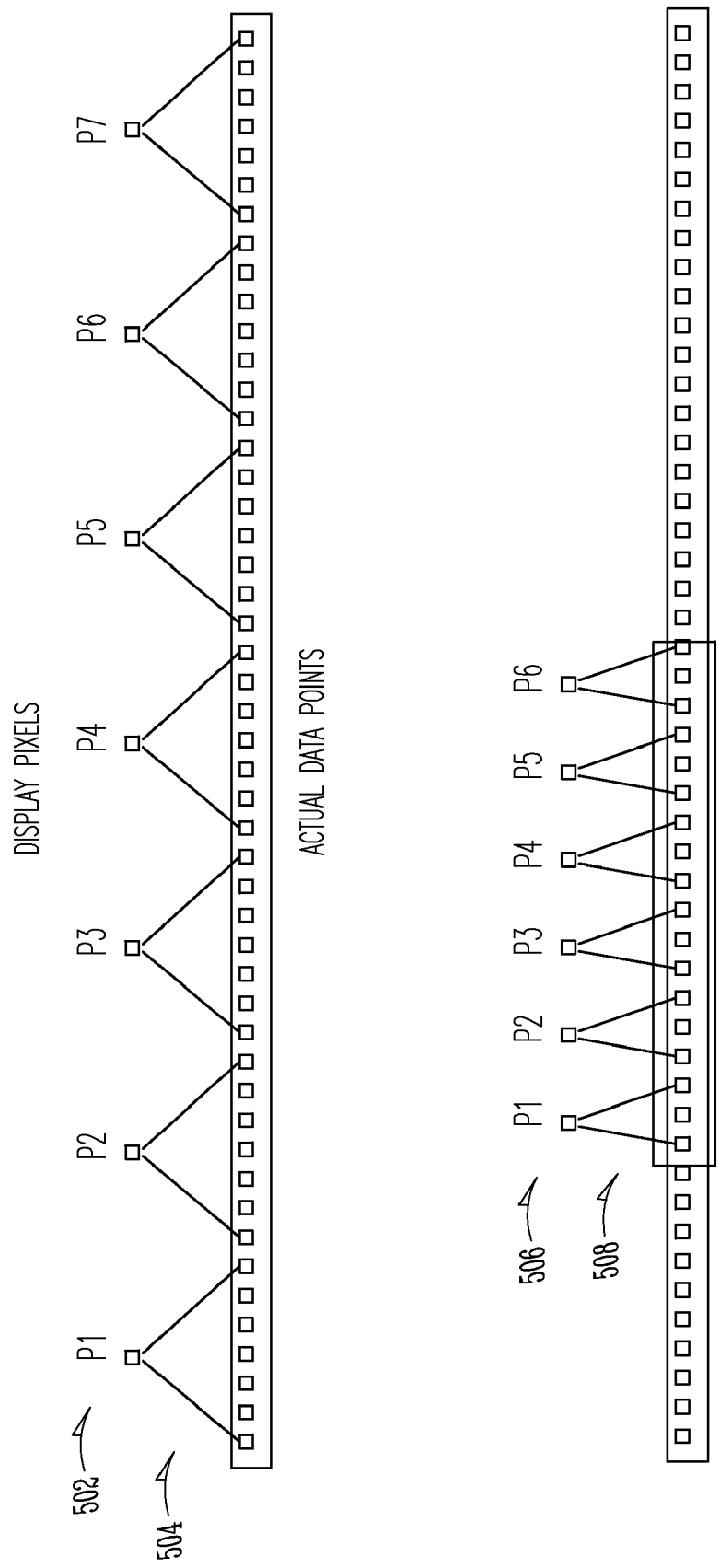
FIG. 5 shows a conventional process for reading and displaying signal data.

Most file data streams are designed to make it easy to create an in-memory representation of the raw data while wasting as little space as possible. They essentially store the names and properties of the signals captured along with the coordinates of each sample point. Sometimes compression is performed to minimize file size. For example, FIG. 5 shows a conventional process of reading this type of data for display purposes where display pixels (P1, P2, P3, . . . ) 502 are generated by sampling data over fixed time windows of the data 504. Typical data readers will parse all input data samples within a specified range. When a zoomed-in view is required, the time window is decreased for all samples. A new set of display samples 506 is generated using the smaller time windows 508. In general, these solution approaches trade off write performance for memory overhead so that higher performance is achieved at the expense of greater memory footprints. For very large signal sets, the trade off becomes untenable and system performance is severely impacted.

To reduce the number of points needed at display time, embodiments of the present invention employ hierarchical B-tree representations of the output data stream. As is well-known to those skilled in the art of computer science, B-trees are data structures that keep data sorted and allow amortized logarithmic time insertions and deletions. (Thomas H. Cormen, Charles E. Leiserson, Ronald L. Rivest, and Clifford Stein. *Introduction to Algorithms*, Second Edition. MIT Press and McGraw-Hill, 2001, Chapter 18: B-Trees, pp. 434-454.)

Figure 6:
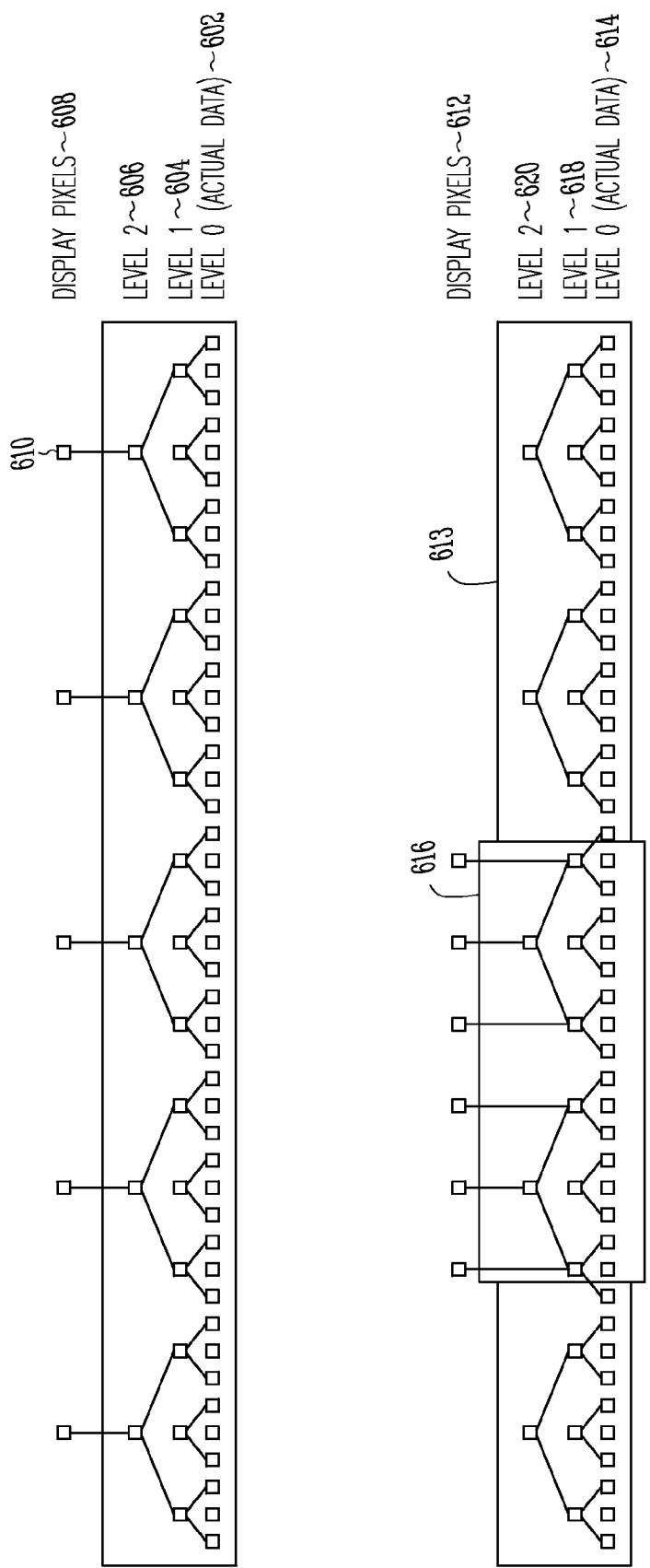
FIG. 6 shows a process for reading and displaying signal data according to an embodiment of the present invention.

FIG. 6 shows a hierarchical data structure according to an embodiment of the present invention. Actual data (e.g., buffers in memory or blocks in storage) is represented as zeroth level 602, and a first level 604 and a second level 606 are also shown from the B-tree data structure. Display pixels 608 are obtained by sampling values 610 through this hierarchy. When the display pixels 612 must be retrieved at greater granularity (e.g., zooming in on an image 613), the actual data 614 can be sampled 616 more narrowly through the higher-order levels 618, 620. That is, as the user zooms in to greater levels of detail, the B-tree is traversed at successively deeper levels to retrieve data at the desired resolution. In this way the present invention enables data retrieval with no loss of precision (e.g., lossless) depending on the requirements of the operational setting.

In this way, embodiments of the present invention construct and store hierarchical B-tree representations of the output data stream. At any given level N of the viewing hierarchy, each node in the B-tree summarizes the information from multiple nodes at level N+1. The b-tree is constructed by sequentially computing the min/max X/Y ranges of each signal as it buffered and written to the output stream. When the maximum number of samples for each signal node (at a given level) have been reached, the min/max values stored in the node are flushed to disk, and values are then posted as a signal range to the parent node. The parent node also accumulates the min/max X/Y values and flushes its value range to disk when its sample limit has been reach. This process is repeated recursively as min/max sample values are flushed to disk and propagated up the tree hierarchy. When the data are then visualized, sample nodes are read in from the appropriate level of the B-tree hierarchy.

Essentially, this representation trades off size for efficiency while using optimal B-tree spanning factors and dynamic data pattern recognition. The dimensions for the B-tree hierarchy may varied to improve performance in a given application. Nominal values for each node level are (starting from Level 0): [(512 to 1024), (8 to 16), 4, 4, 4, . . . ]. In some operational settings, these sizes have provided high performance without increasing the CPU (Central Processing Unit) and disk overhead by more than 15%. It is also possible to reduce the output file size by lossless compression algorithm and run-length encoding to minimize the amount of information stored.

In this way, embodiments of the present invention optimize the output data stream so that the most practical views of the data are easily accessible, regardless of the length of the data streams and multiple resolutions at which they need to be displayed. The term "practical" refers to the fact the most computer display screens have very limited resolution when compared to the resolution represented in the data. These views almost never require access to the entire dataset in all of its detail (although the entire dataset is still represented out of necessity). Given that most screens are typically 800-1600 pixels wide, it does not make sense to force a waveform display tool to read the entire dataset and generate the relatively few points from the entire dataset, which may consist of millions or even billions of sample points.

These embodiments are able to utilize a hierarchical data representation with a variable length buffering scheme and a weighting algorithm that dynamically adjusts the size of the signal buffers depending on the number of signals added to the output set. As more signals are added, the size of each new signal is reduced monotonically in an inverse exponentially back-off sequence that is also weighted by the sampling frequency. In this manner, small-to-moderate-sized signal sets will benefit fully from in-memory write buffering. Larger signal sets will experience graceful degradation of write performance, with lower rate sampled signals achieving less performance gains than higher rate sampled signals. Furthermore, low-rate signals with previously large allocated buffer sizes will be reduced as more signals are added. This approach has two benefits: (1) Overall performance of the system is maximized because high-rate sampled signals have greater impact on write performance and receive greater buffer allocation sizes; (2) The dynamic inverse exponential back-off scheme ensures that the total memory overhead of the writing process bounded by an order O(log N) limit as opposed to order O(N) limit As a result, performance and memory overhead degrades logarithmically with the number of signals stored instead of linearly (e.g., with conventional approaches).

Figure 7:
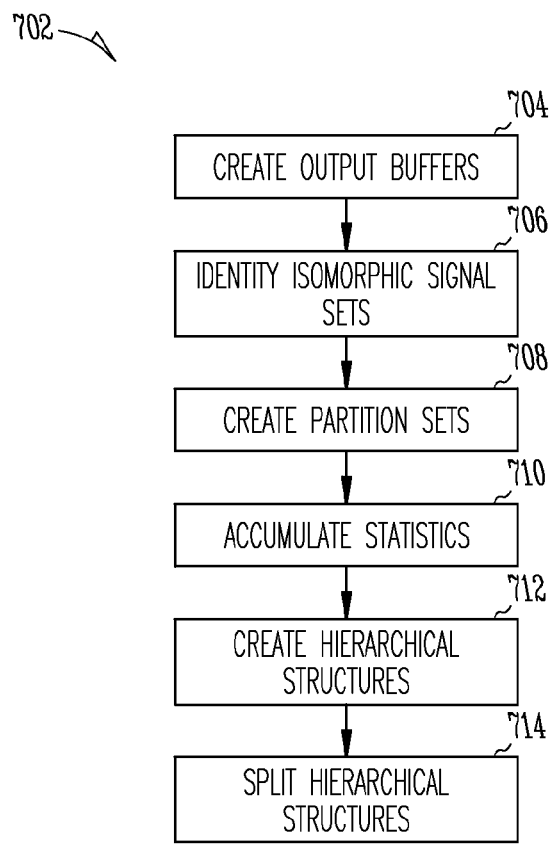
FIG. 7 shows a method for processing signals according to an embodiment of the present invention.

FIG. 7 shows an embodiment of the present invention that utilizes the above-described features. A method 702 for processing signals includes the following sequence of operations on a set of output signal data streams in a highly recursive set of procedures: First, create variable length output buffers for each signal to be optimized, optionally filtered, and optionally run-length compressed (e.g., only changes in signal values are recorded) 704. Next identify isomorphic signal sets (e.g., those with identical X and Y values), if needed 706. Next, create partition sets of signals in which each partition consists of signals that have identical X time sample points (i.e., iso-temporal samples), and continuously re-partition as needed to reflect branching in sampling rates of iso-temporal signal sets 708. Next, accumulate statistics of each signal over a specified time window consisting of a fixed number of time samples 710. The time window is successively advanced in a block-by-block fashion as time samples are added. Next create a hierarchical multi-resolution block representation of each signal which captures key statistical properties for each block at each resolution level 712. Next split the hierarchical tree structures as needed to reflect changes in the signal partition sets 714.

These statistical properties 710 for each block at each resolution level may include: (i) The minimum and maximum X and Y values seen (Xmin, Xmax, Ymin, Ymax); (ii) The X values corresponding to Ymin and Ymax (Xymin, Xymax);

(iii) The Y values corresponding to Xmin and Xmax (called Yxmin, Yxmax); (iv) The number of sample points captured in this block; and (v) The physical location of the first child block.

Figure 9:
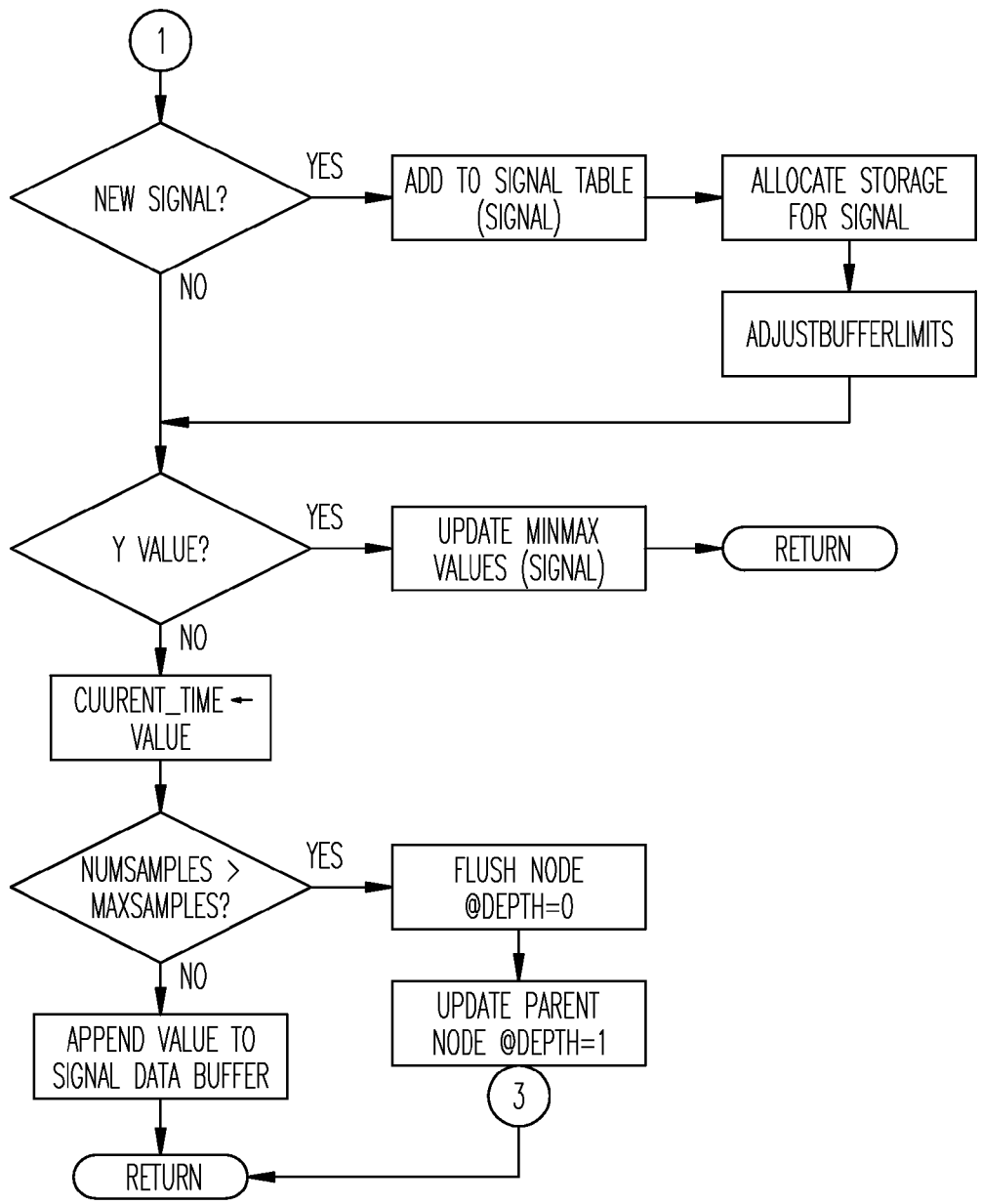
FIGS. 9, 10, 11, and 12 show flow diagrams related to the pseudo-code shown in FIG. 8.
Figure 14:
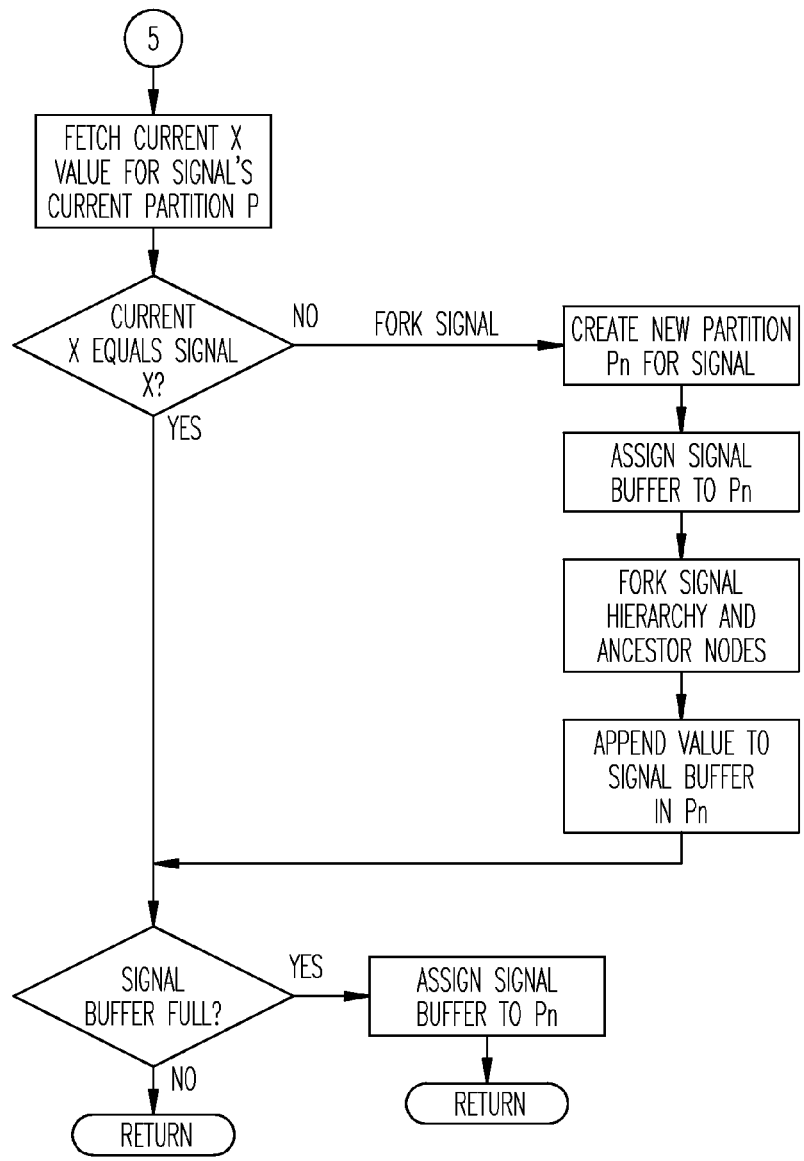
FIG. 14 shows a flow diagram related to the pseudo-code shown in FIGS. 13A and 13B.

Greater detail for this method 702 is presented in pseudo-code 802 in FIG. 8 for the construction of the hierarchical tree structure in the case of a single-rate (i.e., synchronous) partition and the pseudo-code 1302 in FIGS. 13A-13B for partitioning multi-rate (i.e., asynchronous) signals into single-rate partitions. Flow diagrams related to subroutines in FIG. 8 are shown in FIG. 9 (PutValue), FIG. 10 (AdjustBufferLimits), FIG. 11 (UpdateParentNode), and FIG. 12 (CloseDataset). A Flow diagram related to the pseudo-code in FIGS. 13A-13B is shown in FIG. 14.

The pseudo-code 802 for constructing the hierarchical tree structure in the case of a single-rate partition includes three steps. First, the hierarchy is generated by calls to PutValue for each signal value 804. Here the source of the "value" argument is identified by the "signal" argument (e.g., X, Y1, Y2, Y3, Y4 in FIGS. 3 and 4). Typically the signal "time" is used as a reserved signal name to represent the composite X values. Additional details for Putvalue are shown in FIG. 9.

Figure 10:
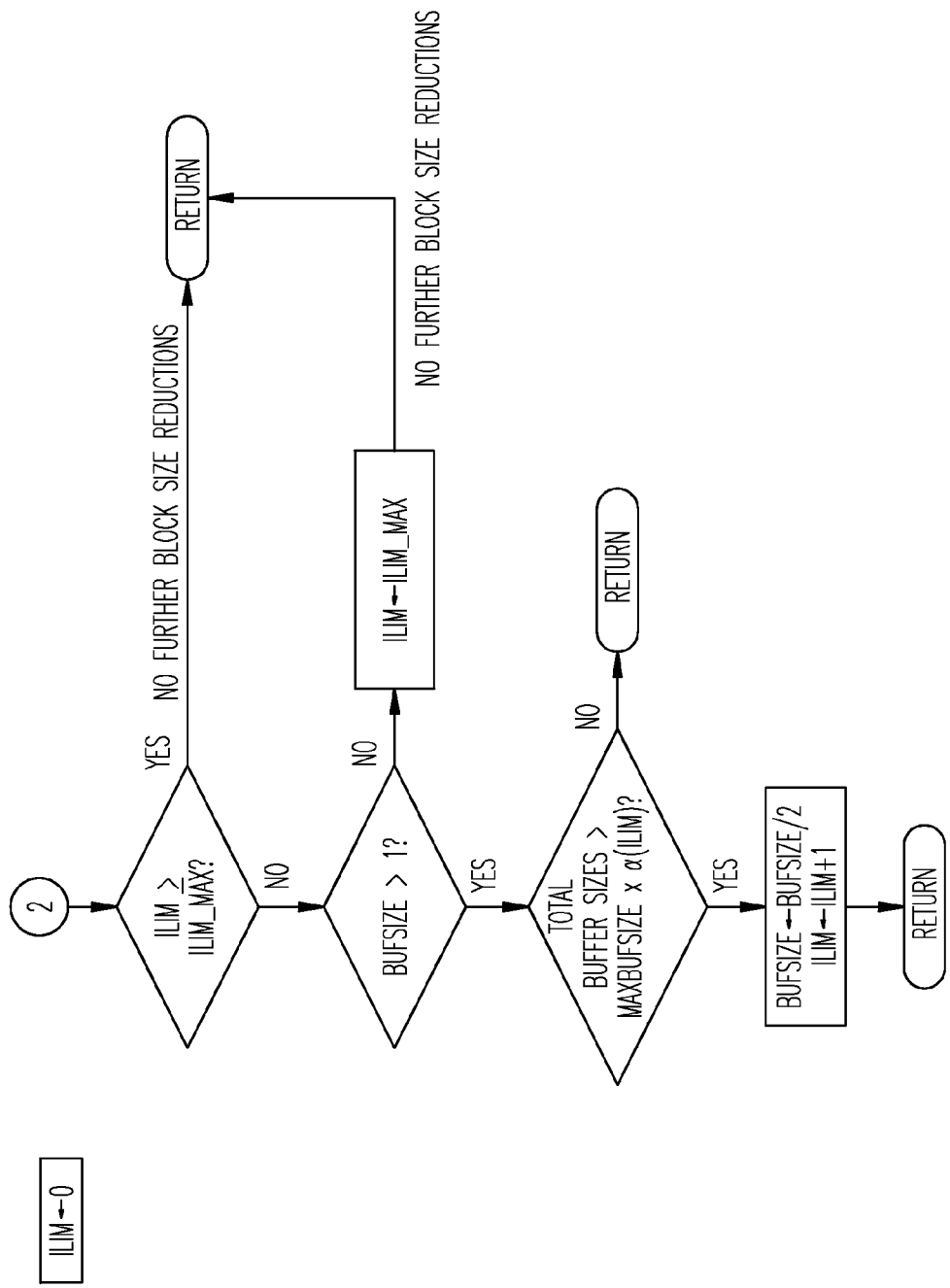

In FIG. 9 storage is allocated for the signal by a call to AllocateStorageFor to allocate buffer storage based on the total amount of buffer storage currently in use versus the predetermined target limit for total buffer storage. When the total buffer usage approaches a sizable fraction of the limit, then subsequent buffer allocation sizes are reduced by one half (controlled by function AdjustBufferLimits as depicted in FIG. 10). Existing buffers are de-allocated after they are flushed and then re-allocated when needed with the new reduced size. This exponential back-off strategy limits the growth of memory overhead due to increasingly large number of output signals to be buffered. Although it does not impose a hard limit on total output buffer overhead, it does slow down the rate of growth of the overhead to allow for graceful degradation of performance as the number of signals becomes unusually large.

Figure 11:
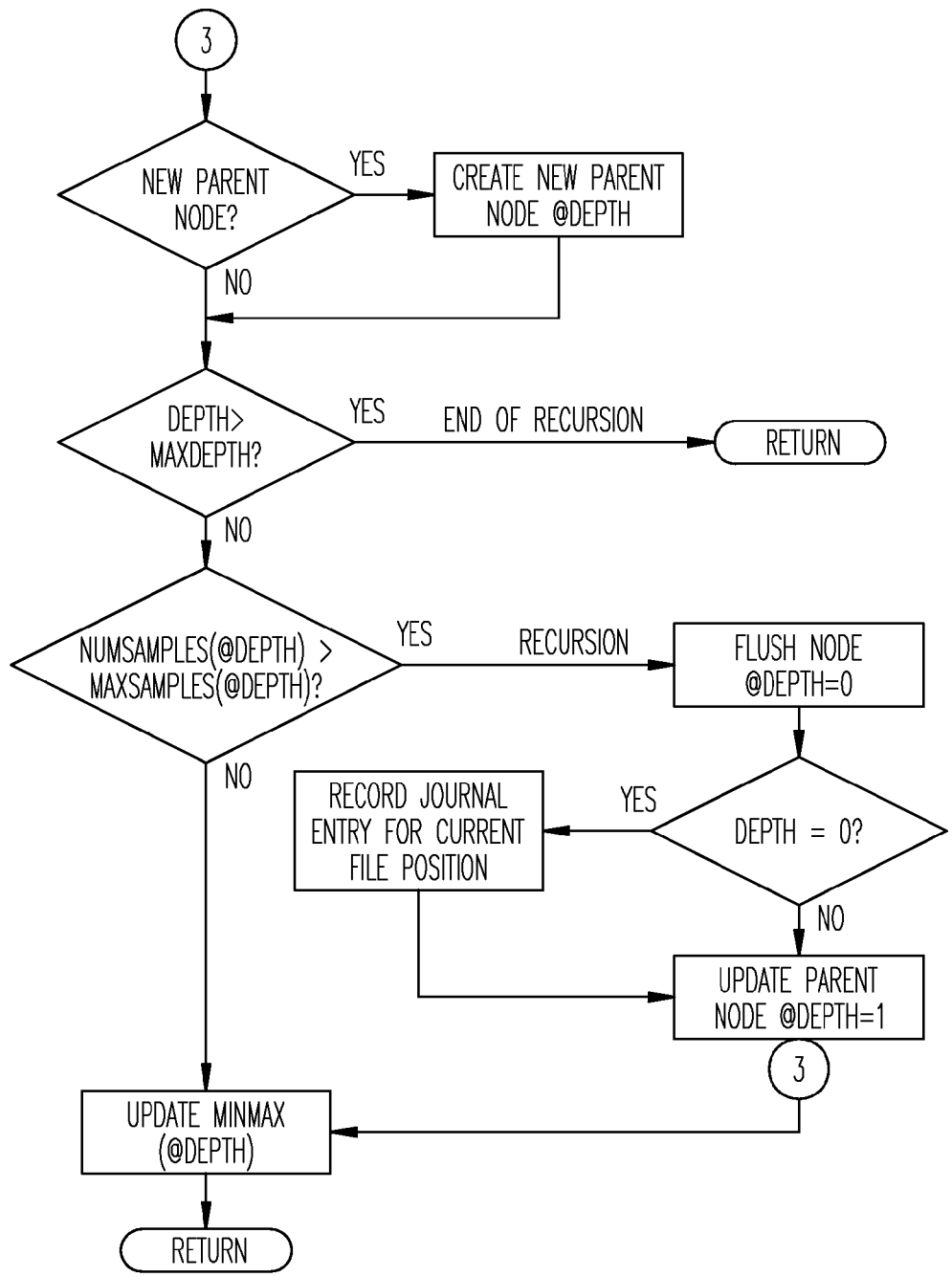

For each new signal value in FIG. 9, min/max X and Y ranges are accumulated for the lowest level in the hierarchy (level 0). When the maximum number of values have been accumulated for each block in level 0, the cumulative min/max range is then propagated to the next higher level, and this process is recursively repeated for the higher levels until the maximum tree depth has been achieved (this is depicted in FIG. 9 as the call to UpdateParentNode). The UpdateParentNode procedure will recursively propagate min/max values of time and signal values to all parent nodes in the hierarchy (as illustrated in FIG. 11).

As new signals are added to the output stream in FIG. 9, the data buffer sizes for buffers used to store signal values are adjusted by a call to AdjustBufferLimits (FIG. 10) before values are written to disk. The buffer sizes are reduced in size using an exponential or geometric back-off schedule to slow down the rate of growth of memory allocated to data buffering. Note that these buffers are not part of the hierarchical min/max trees. Instead, they are used to buffer the actual data points themselves so that they can be grouped contiguously according to partition sets. Also note that the buffers are not resized until after their data has been flushed.

Next, nodes are updated including recording journal entries and, when needed, increasing the depth of a tree) by calls to UpdateParentNode 806. Details for are UpdateParentNode shown in FIG. 11.

Figure 12:
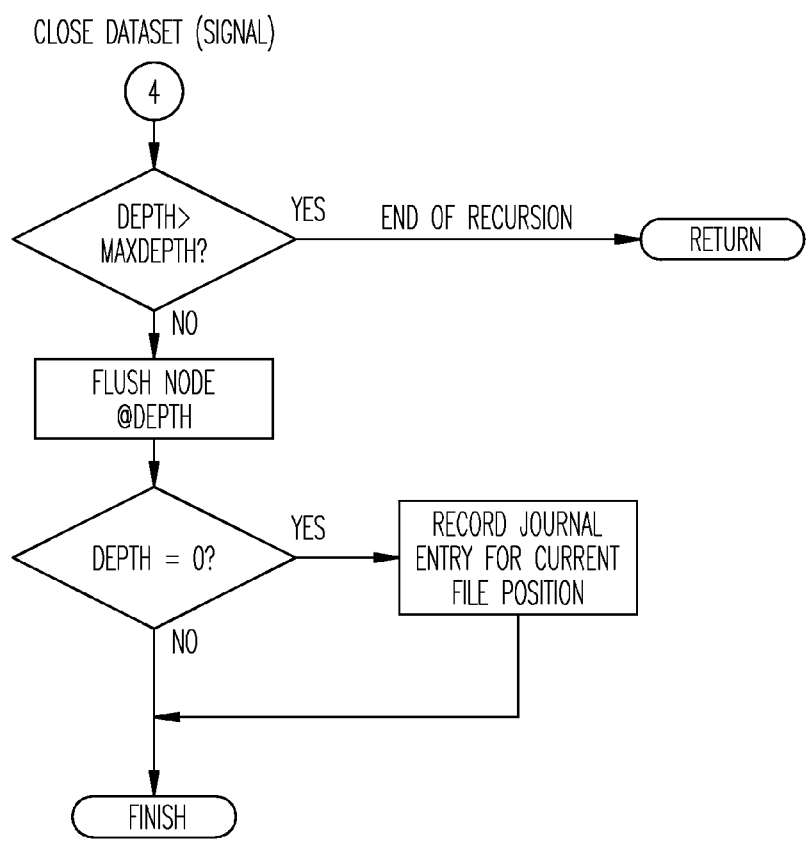

Next, after all signals have been processed, the buffer memory is flushed by calls to CloseDataset 808. Details for CloseDataset are shown in FIG. 12. This final invocation is necessary to ensure that any interior and leaf nodes that have not exceeded their buffer size limits are committed to disk before the algorithm exits.

The pseudo-code 802 enables the construction of a hierarchical data structure for managing and buffering multi-resolution data blocks before they are written out to disk. However, the full tree is never maintained in memory. Instead, nodes from the tree are removed from memory as they are written out to disk. Because the data is single-rate, the data stream consists of a sequence of time values and a set of signal Y values for each time point for each signal (as depicted in FIGS. 2 and 3). As discussed below with reference to FIGS. 13A, 13B and 14, multi-rate data is handled by partitioning the signals into sets according to matching time sequence-points and writing out the sets as individual single-rate data streams.

Figure 15:
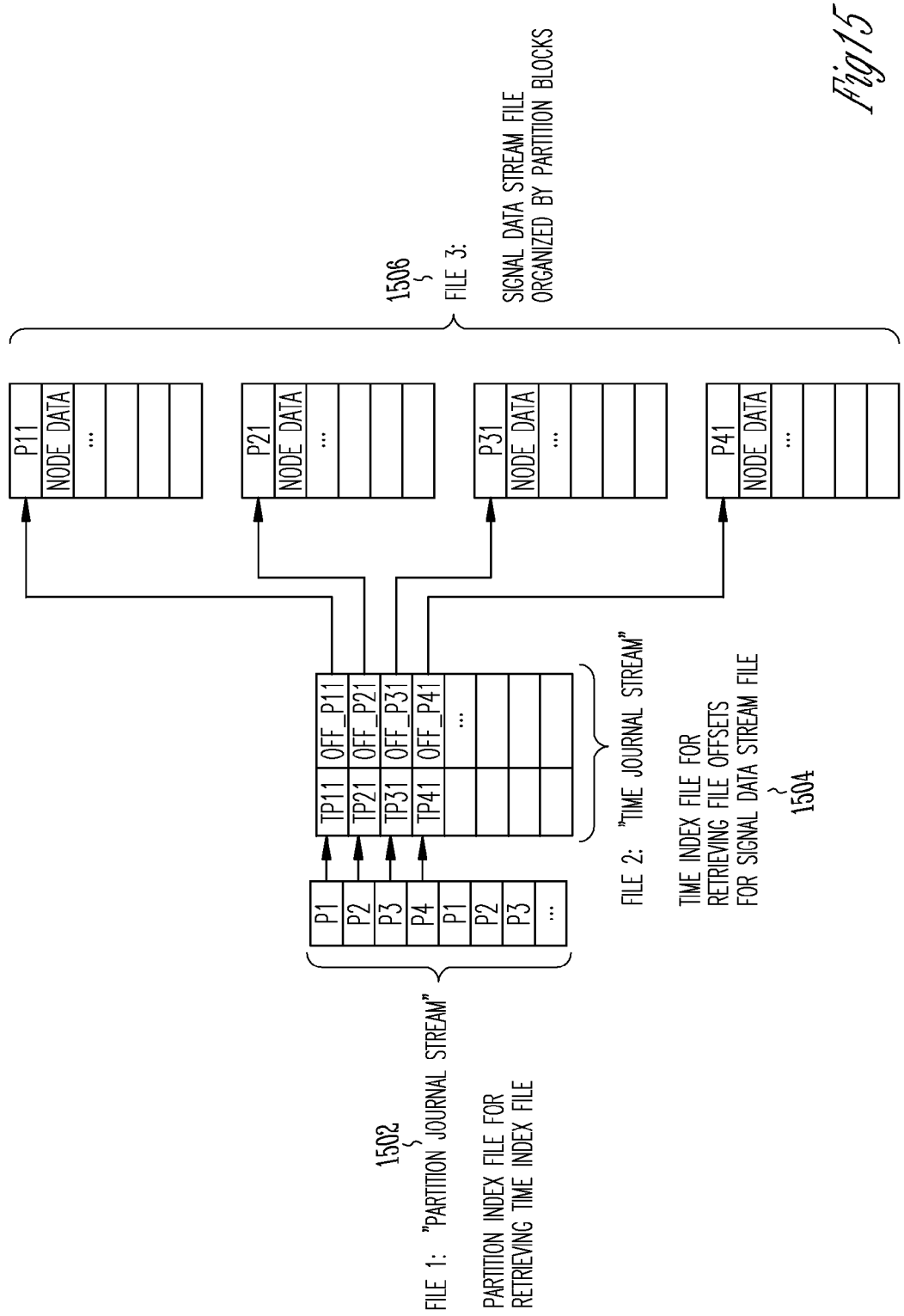
FIG. 15 shows a two-level indexing scheme for indexing signal data according to an embodiment of the present invention.

It should be noted that as the single-rate data blocks are written to disk, record entries in the two-level index files that will allow for fast retrieval of selected signal data within specified time ranges. The first level index file keeps a journal of all the locations of entries recorded in the second level index file by partition number. The second level index file keeps a journal of all the time ranges for partition sets and their file offsets in the actual signal data file. This two-way indexing scheme is illustrated in FIG. 15 which shows a two-level indexing scheme including a partition-index file 1502 for retrieving the time index file, a time index file 1504 for receiving file offsets for the signal data stream file 1506, and a signal data stream file 1506 organized by partition blocks. Note that multi-level hierarchical indexing of the partition index file can also be employed to further speed up searching of data by signal, partition, or time values.

This two-level indexing facilitates efficient data retrieval in multiple ways according to a user's needs. For example, FIG. 16 shows data associated by temporal coherency 1602, where samples with similar X (time) values are grouped together, and signal coherency 1604, where samples are grouped by signal name. For multi-rate data, coherency in the time dimension is typically more important for retrieving individual signals for display and computation. However, in many operational settings it is desirable to obtain efficient access to either or both associations of signal data.

As noted above, multi-rate data is handled by partitioning the signals into sets according to matching time sequence points and writing out the sets as individual single-rate data streams. FIGS. 13A, 13B shows pseudo-code 1302 for partitioning multi-rate (i.e., asynchronous) signals into single-rate partitions and FIG. 14 shows a related flow diagram.

When single-rate data is written out (i.e., only one partition set is present), the nodes for each level of the hierarchy can be written out to separate files. This facilitates faster retrieval of hierarchy information when reading the signal stream. In this way, the present invention leverages the single-rate algorithm by dynamically decomposing the asynchronous data streams into equivalent partition sets of single-rate data streams. This partitioning scheme allows for very rapid reading of asynchronous signal streams, in particular, for those situations where the total number of signals is extremely large. Each set will contain those signals that all share the same x-vectors. If all signals share the same x-vector, then there will be exactly one partition set that contains all the signals. If no signals share the same x-vectors, then each signal will have its own partition. In general, the number of set partitions will be equal to the number of unique x-vector sequences.

The pseudo-code 1302 is largely self-explanatory. Major steps of this signal partitioning method are outlined as follows. First, begin with the assumption that all signals belong to one single partition. Second, initialize the buffer memory pool and allocate signals buffers for known signals with each buffer size equal to the size of the buffer pool divided by the number of signals. Third, for each new signal (x, y) sample point added to the data stream, check to see if the sample x-value matches the current x-value of all the signals in the same partition P. If signal buffer is not allocated from buffer pool, find an available existing signal buffer to split and re-allocate.

Fourth, if the x-value matches, then proceed to append the sample point with no changes to the partition sets. Fifth, if the x-value does not match, then check to see if any previously created new partition P* with signals that directly originated from the current partition P contains a matching x-value. If so, reassign the current signal to partition P*. If the x-value does not matching any newly created partitions, then create a new partition Pn and reassign the signal to Pn. Sixth, when a new partition Pn is created, fork (copy) the hierarchy information of the original partition P to the newly created partition Pn. Seventh, update the partition index table to reflect any changes to the partition sets and repeats steps 2-6 for all signal sample points.

The combination of generating hierarchical data structure for synchronous signals 702 and partitioning asynchronous signals into partitions of synchronous signals 1302 leads to substantial advantages for signal processing, especially for applications for large numbers of signals over long time intervals. The above-described embodiments of the present invention can enable these advantages through one or more of the following features: (1) the use of hierarchical min/max B-trees to capture the signal x- and y-ranges at different levels of resolution; (2) the decomposition of multi-rate data streams into equivalent sets of single-rate data streams which can be efficient written and read; (3) the use of an exponential back-off strategy for dynamically reducing the data buffer allocation sizes to slow the rate of growth of memory usage, thereby providing a more graceful degradation of performance as the total number of signals grows inordinately larger; and (4) the use of two-level indexing files that allow for rapid location and retrieval of arbitrary signal sets within specified time ranges.

Figure 17:
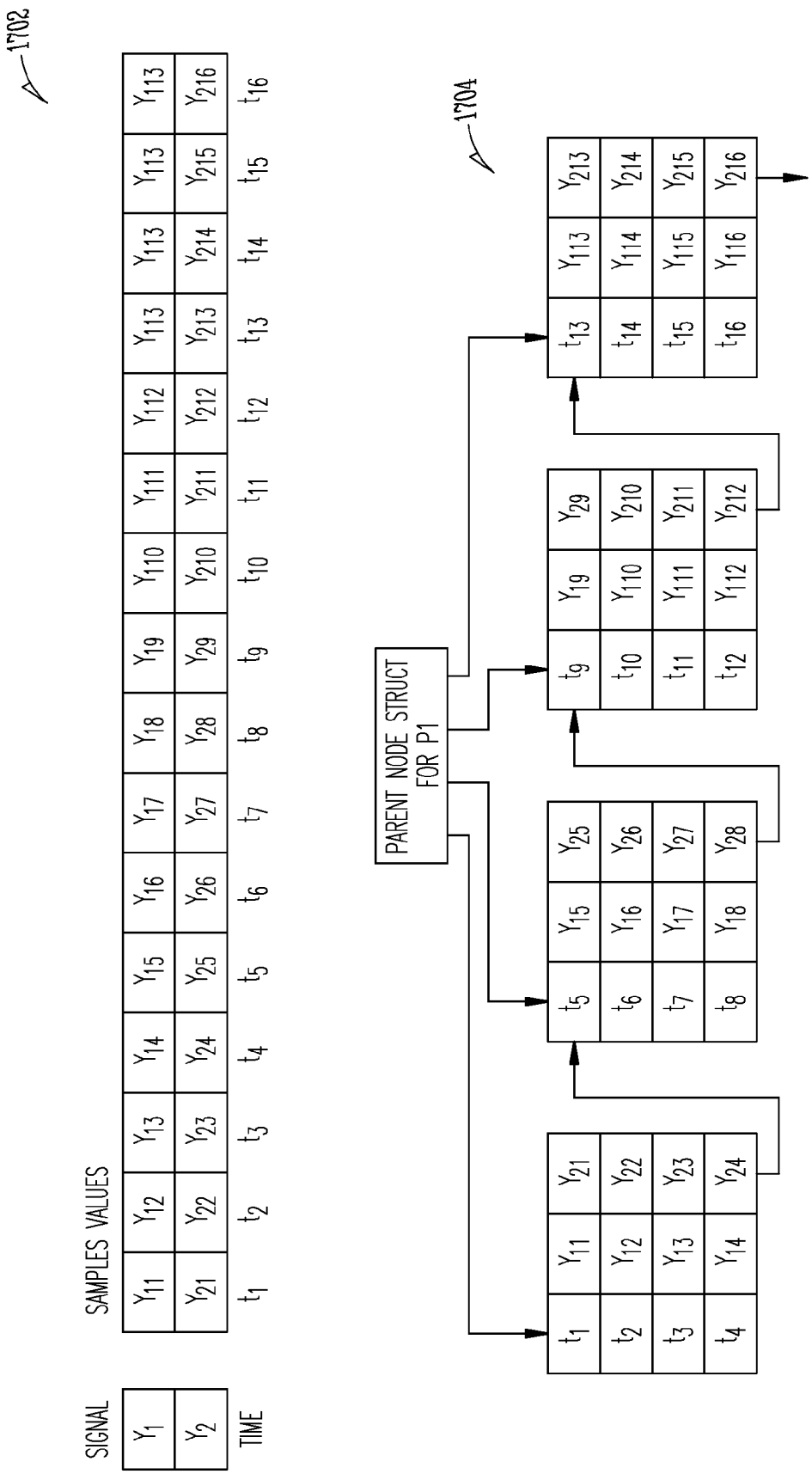
FIGS. 17, 18, and 19 show exemplary data structures that relate to embodiments of the present invention.
Figure 18:
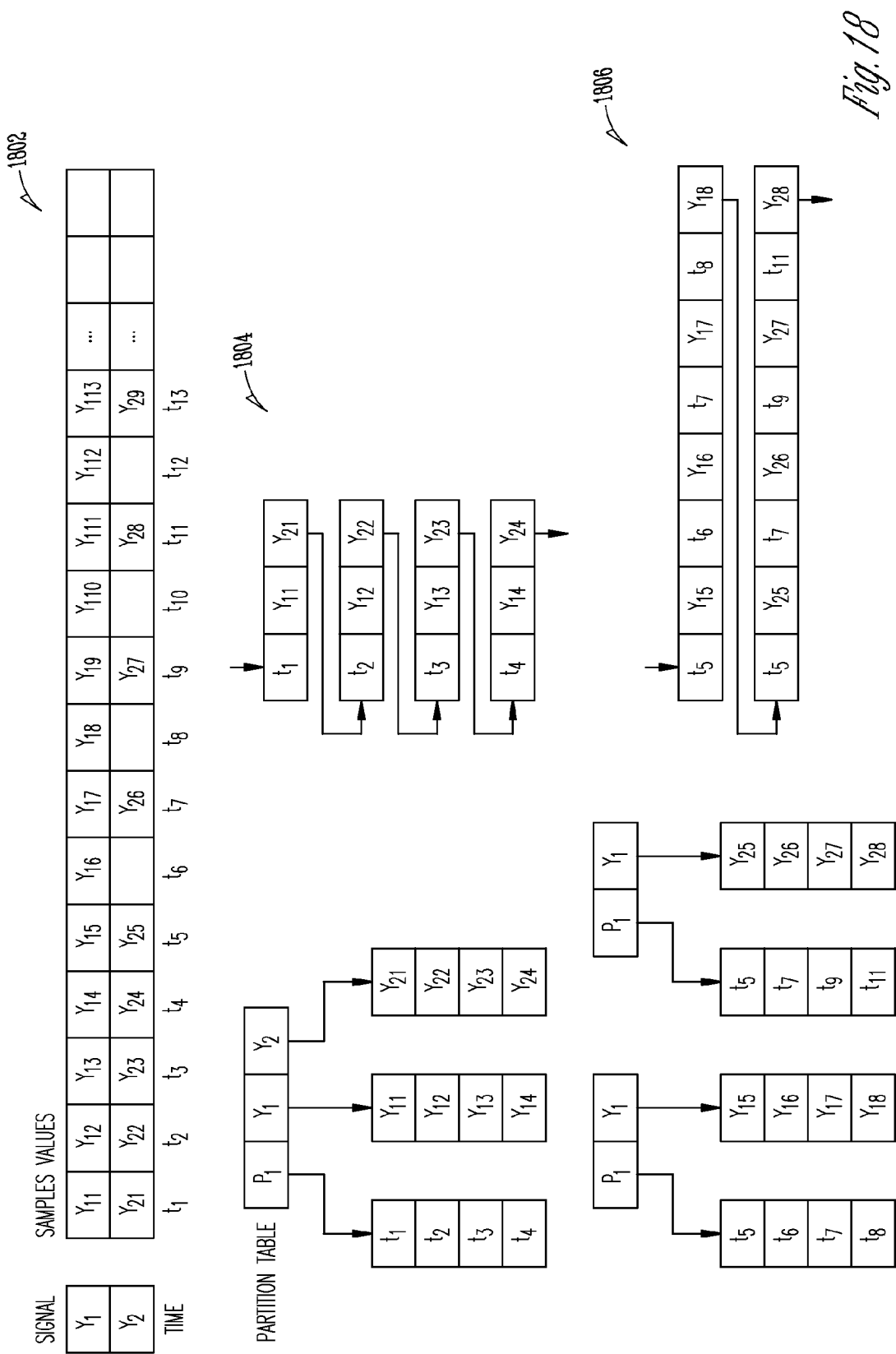
Figure 19:
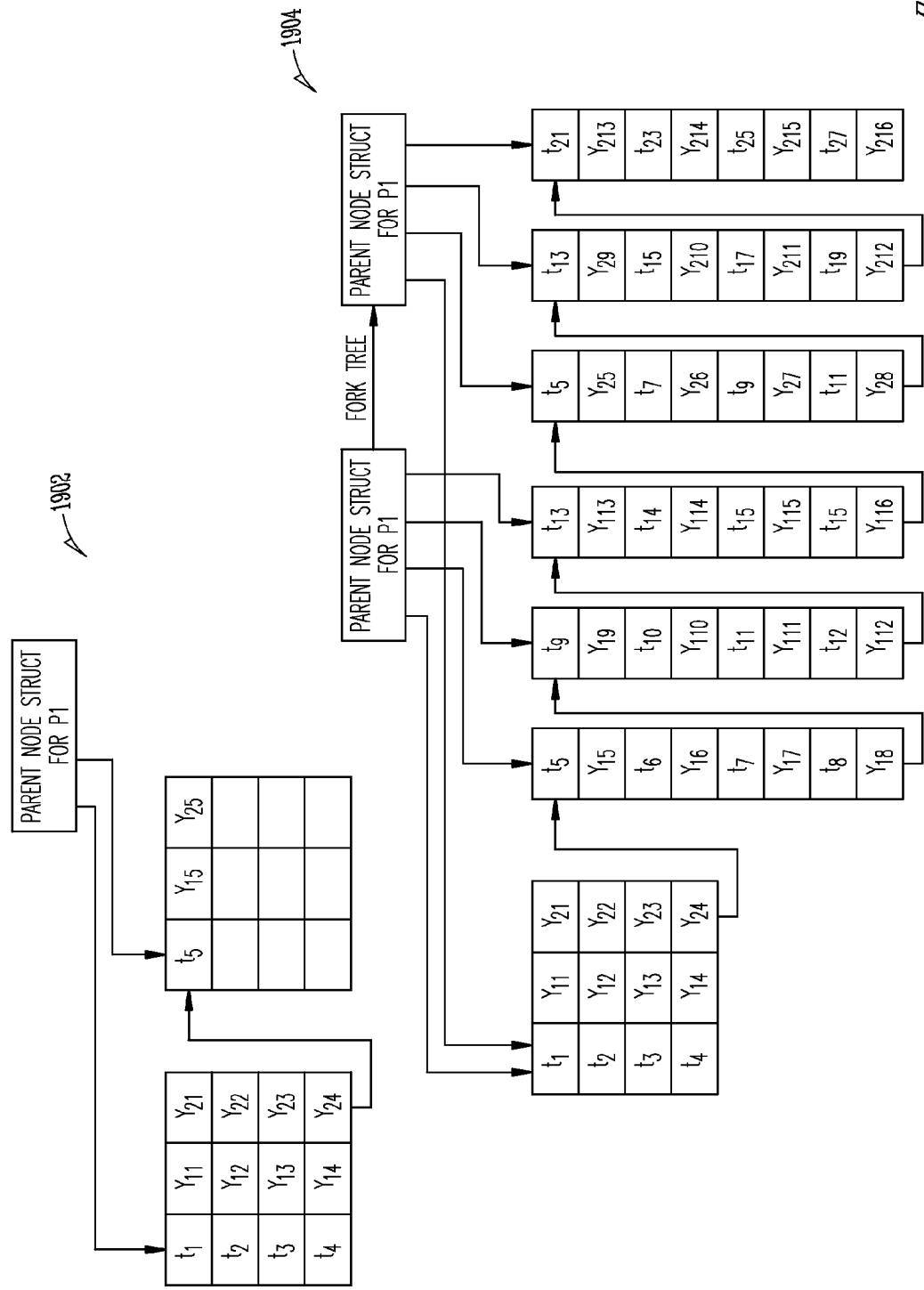

FIGS. 17-19 show specific embodiments of data structures that illustrate how the above-described embodiments operate on synchronous and asynchronous data. FIG. 17 shows two synchronous signals 1702 illustrated in a matrix form (e.g., analogous to FIG. 3) together with a partition structure 1704 for partition P1, where the buffer sizes accommodate four sets values for time and the two signals. The hierarchical tree representation 1704 also shows the data vector layout for the iso-temporal signal stream by the arrow marks between data values.

FIG. 18 shows two signals that begin synchronously (e.g., t1-t5) and then become asynchronous (e.g., at t6) 1802. A partition table 1804 shows the synchronous structure for the first four time values (e.g., the size of the buffer) and corresponding structure in memory. When the time values for Y2 and Y1 deviate (e.g., in the block starting at t5), a second partition is formed with a corresponding partition table 1804 that shows that the signals now belong to separate partitions.

FIG. 19 shows the forking process for the signals in FIG. 18. Initially, signal data is stored in a common partition 1902. When the new partition is added, the tree must be forked along the partition lines.

Figure 20:
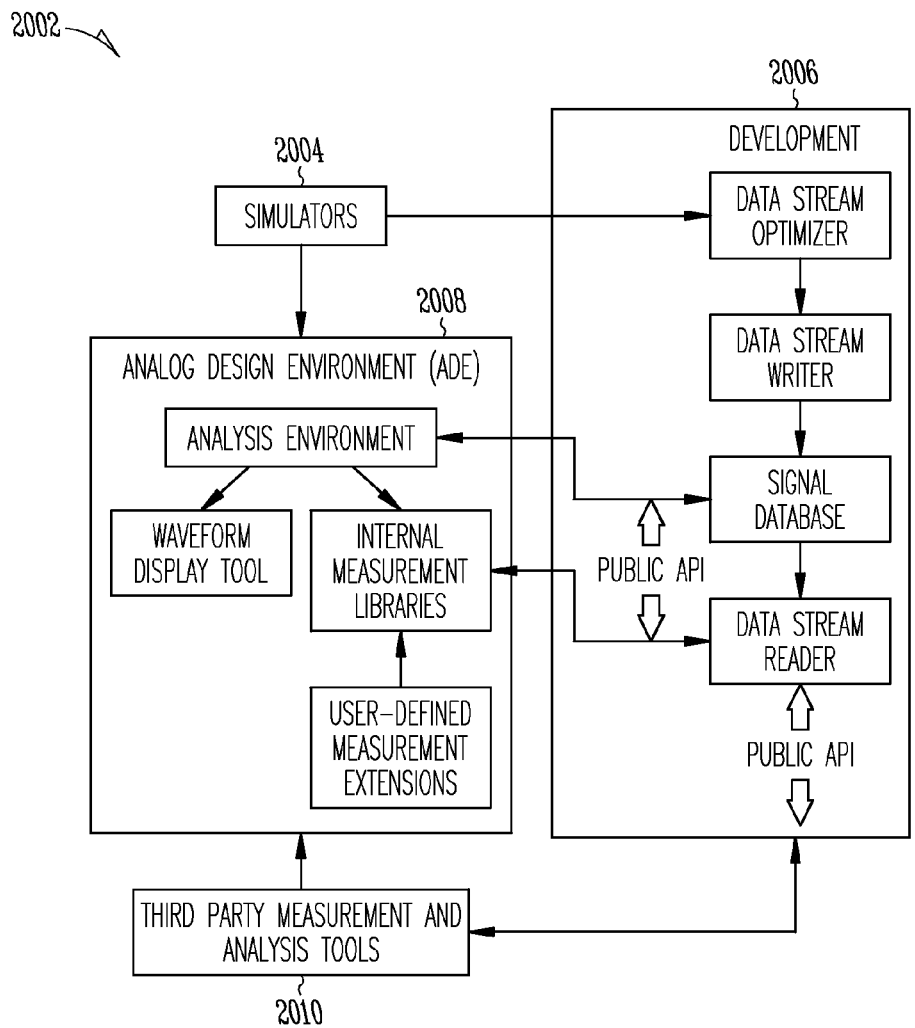
FIG. 20 shows a dataflow architecture for processing signals according to an embodiment of the present invention

FIG. 20 shows a dataflow architecture 2002 for an embodiment of the present invention related to the above-described methods. The architecture includes simulators 2004, a data generator 2006, an Analog Design Environment (ADE) 2008 and possibly third party analysis and measurement tools 2010.

The data generator 2006 generates hierarchical data structures in accordance with the above-described embodiments of the present invention. The data stream optimizer partitions asynchronous signals into sets of synchronous signals (FIGS. 13A, 13B) and creates the hierarchical data structures (FIG. 8) The data stream writer writes blocks of data to the signal database (FIG. 8) and the data stream reader correspondingly extracts data from the hierarchy (FIGS. 6, 15). A public API (Application Program Interface) can be used to interface the data generator 2006 with the ADE 2008 and the third party tools 2010. This API can be used to support highly accelerated measurement functions related to the statistical values stored in the hierarchical data structure (e.g., the statistical properties 710 described above).

Additional embodiments relate to an apparatus for carrying out any one of the above-described methods, where the apparatus may include a computer for executing computer instructions related to the method. In this context the computer may be a general-purpose computer including, for example, a processor, memory, storage, and input/output devices (e.g., monitor, keyboard, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of processing signals, comprising:
sampling a plurality of signals, each sampled signal including a plurality of signal values and corresponding time values;
partitioning the sampled signals into a plurality of partitions, each partition including signal values and corresponding time values for signals having identical time values within a partition time interval, wherein at least one additional partition is formed when two sampled signals diverge from identical time values;
saving signal values and time values from partitions in buffers corresponding to the partitions in accordance with a hierarchical tree data structure, wherein the buffers represent allocations of memory for saving partition values and partitioning the sampled signals includes splitting at least one buffer into multiple buffers when corresponding signals diverge from identical time values so that the multiple buffers correspond to partitions having identical time values;

storing at least some buffer values in blocks when sizes of the buffers reach corresponding buffer-limit sizes; and flushing the stored buffer values from the buffers to free-up corresponding allocations of memory.

2. The method of claim 1, further comprising:

adjusting one or more buffer-limit sizes to control a combined allocation of memory for the buffers.

3. The method of claim 1, further comprising:

allocating memory for one or more additional buffers in response to sampling one or more additional signals.

4. The method of claim 1, further comprising:

determining buffer-characterizing values for characterizing the signal values in the buffers.

5. The method of claim 4, wherein the buffer-characterizing values include minimum signal values and maximum signal values for sampled signals in a corresponding partition.

6. The method of claim 1, further comprising:

arranging the buffers sequentially into a first level of nodes; and determining an arrangement of second level of nodes so that each second level-node corresponds to a sequence of the first level nodes.

7. The method of claim 6, further comprising:

determining an arrangement of third level of nodes so that each third level-node corresponds to a sequence of the second level nodes.

8. The method of claim 6, further comprising:

determining buffer-characterizing values for characterizing the signal values in the buffers; and determining node-characterizing values for second-level nodes from the buffer-characterizing values of buffers corresponding to the second-level nodes.

9. The method of claim 1, further comprising:

arranging the buffers into a plurality of levels including a first level and a plurality of higher-order levels, wherein the first level includes a sequential arrangement of nodes corresponding to the buffers, and higher-order levels correspond to sequential arrangements of nodes on previous-order levels.

10. The method of claim 9, further comprising:

determining buffer-characterizing values for characterizing the signal values in the buffers; and determining node-characterizing values for nodes at higher-order levels based on node-characterizing values at previous-order levels, wherein node-characterizing values for the first level are the buffer-characterizing values.

11. A non-transitory computer-readable medium that stores a computer program for processing signals, wherein the computer program includes instructions for:

sampling a plurality of signals, each sampled signal including a plurality of signal values and corresponding time values;

partitioning the sampled signals into a plurality of partitions, each partition including signal values and corresponding time values for signals having identical time values within a partition time interval, wherein at least one additional partition is formed when two sampled signals diverge from identical time values;

saving signal values and time values from partitions in buffers corresponding to the partitions in accordance with a hierarchical tree data structure, wherein the buffers represent allocations of memory for saving partition values and partitioning the sampled signals includes splitting at least one buffer into multiple buffers when corresponding signals diverge from identical time values so that the multiple buffers correspond to partitions having identical time values;

storing at least some buffer values in blocks when sizes of the buffers reach corresponding buffer-limit sizes; and flushing the stored buffer values from the buffers to free-up corresponding allocations of memory.

12. The computer-readable medium of claim 11, wherein the computer program further includes instructions for:

adjusting one or more buffer-limit sizes to control a combined allocation of memory for the buffers.

13. The computer-readable medium of claim 11, wherein the computer program further includes instructions for:

allocating memory for one or more additional buffers in response to sampling one or more additional signals.

14. The computer-readable medium of claim 11, wherein the computer program further includes instructions for:

determining buffer-characterizing values for characterizing the signal values in the buffers.

15. The computer-readable medium of claim 14, wherein the buffer-characterizing values include minimum signal values and maximum signal values for sampled signals in a corresponding partition.

16. The computer-readable medium of claim 11, wherein the computer program further includes instructions for:

arranging the buffers sequentially into a first level of nodes; and determining an arrangement of second level of nodes so that each second level-node corresponds to a sequence of the first level nodes.

17. The computer-readable medium of claim 16, wherein the computer program further includes instructions for:

determining an arrangement of third level of nodes so that each third level-node corresponds to a sequence of the second level nodes.

18. The computer-readable medium of claim 16, wherein the computer program further includes instructions for:

determining buffer-characterizing values for characterizing the signal values in the buffers; and determining node-characterizing values for second-level nodes from the buffer-characterizing values of buffers corresponding to the second-level nodes.

19. The computer-readable medium of claim 11, wherein the computer program further includes instructions for:

arranging the buffers into a plurality of levels including a first level and a plurality of higher-order levels, wherein the first level includes a sequential arrangement of nodes corresponding to the buffers, and higher-order levels correspond to sequential arrangements of nodes on previous-order levels.

20. The computer-readable medium of claim 19, wherein the computer program further includes instructions for:

determining buffer-characterizing values for characterizing the signal values in the buffers; and determining node-characterizing values for nodes at higher-order levels based on node-characterizing values at previous-order levels, wherein node-characterizing values for the first level are the buffer-characterizing values.

21. An apparatus for processing signals, the apparatus comprising a computer for executing computer instructions, wherein the computer includes computer instructions for:

sampling a plurality of signals, each sampled signal including a plurality of signal values and corresponding time values;

partitioning the sampled signals into a plurality of partitions, each partition including signal values and corresponding time values for signals having identical time values within a partition time interval, wherein at least one additional partition is formed when two sampled signals diverge from identical time values;

saving signal values and time values from partitions in buffers corresponding to the partitions in accordance with a hierarchical tree data structure, wherein the buffers represent allocations of memory for saving partition values and partitioning the sampled signals includes splitting at least one buffer into multiple buffers when corresponding signals diverge from identical time values so that the multiple buffers correspond to partitions having identical time values;

storing at least some buffer values in blocks when sizes of the buffers reach corresponding buffer-limit sizes; and flushing the stored buffer values from the buffers to free-up corresponding allocations of memory.

22. The apparatus of claim 21, wherein the computer includes a processor with memory for executing at least some of the computer instructions.

23. The apparatus of claim 21, wherein the computer includes circuitry for executing at least some of the computer instructions.

24. The apparatus of claim 21, wherein the computer further includes computer instructions for:

determining buffer-characterizing values for characterizing the signal values in the buffers.

25. The apparatus of claim 24, wherein the buffer-characterizing values include minimum signal values and maximum signal values for sampled signals in a corresponding partition.

26. The apparatus of claim 21, wherein the computer further includes computer instructions for:

arranging the buffers into a plurality of levels including a first level and a plurality of higher-order levels, wherein the first level includes a sequential arrangement of nodes corresponding to the buffers, and higher-order levels correspond to sequential arrangements of nodes on previous-order levels.

27. The apparatus of claim 26, wherein the computer further includes computer instructions for:

determining buffer-characterizing values for characterizing the signal values in the buffers; and determining node-characterizing values for nodes at higher-order levels based on node-characterizing values at previous-order levels, wherein node-characterizing values for the first level are the buffer-characterizing values.

* * * * *